United States Patent [19]

Cescon et al.

[11] Patent Number: 5,612,687
[45] Date of Patent: Mar. 18, 1997

[54] PROCESS FOR REGULATING THE ORIENTATION OF A SUPPORT STRUCTURE SUCH AS THAT CARRYING A HEAD-UP CONTROL SYSTEM ON AN AIRCRAFT

[75] Inventors: Gilles Cescon, Toulouse; Philippe Laborie, Thil; Claude Maffre, St. Gilles; Marie-Odile Neillo, Toulouse, all of France

[73] Assignee: Aerospatiale Societe Nationale Industrielle, Paris, France

[21] Appl. No.: 453,576

[22] Filed: May 26, 1995

Related U.S. Application Data

[63] Continuation of Ser. No. 220,795, Mar. 31, 1994, abandoned.

[30] Foreign Application Priority Data

Apr. 2, 1993 [FR] France .................................. 93 03893

[51] Int. Cl.$^6$ .................................................. G01C 21/00
[52] U.S. Cl. .............................. 340/980; 33/326; 33/366
[58] Field of Search ............................. 340/980; 345/7, 345/8, 9; 359/630; 73/504; 33/318, 326, 366

[56] References Cited

U.S. PATENT DOCUMENTS

| | | | |
|---|---|---|---|
| 3,253,472 | 5/1966 | Klemes . | |
| 3,731,543 | 5/1973 | Gates | 33/318 |
| 3,930,319 | 1/1976 | Johnston | 33/318 |
| 4,470,199 | 9/1984 | Krezak et al. | 33/366 |

FOREIGN PATENT DOCUMENTS

0326256  8/1989  European Pat. Off. .

*Primary Examiner*—Brent A. Swarthout
*Attorney, Agent, or Firm*—Michael N. Meller

[57] ABSTRACT

On an aircraft it is proposed that the orientation (pitch and roll attitudes and heading) of a support structure (10), such as the structure supporting the optical head of a head-up control system, be regulated by means of an inertial unit (16). The said unit is firstly placed on its previously regulated rack (14) in the hold of the aircraft and the three orientation parameters are measured. The inertial unit (16) is then placed on an intermediate support (26) fixed to the support structure (10) and the orientation parameters are again measured. Following the comparison of the two measurements, the orientation of the support structure (10) is corrected so as to cancel out their differences.

4 Claims, 1 Drawing Sheet

PROCESS FOR REGULATING THE ORIENTATION OF A SUPPORT STRUCTURE SUCH AS THAT CARRYING A HEAD-UP CONTROL SYSTEM ON AN AIRCRAFT

This application is a continuation of application Ser. No. 08/220,795, filed Mar. 31, 1994, now abandoned.

FIELD OF THE INVENTION

The invention relates to a process making it possible on an aircraft to regulate or adjust the orientation of a support structure, e.g. constituted by a structure carrying a head up control system or display located in the cockpit or flight deck.

BACKGROUND OF THE INVENTION

Modern aircraft are frequently equipped with a head-up display (HUD). This system, which is installed in the aircraft flight deck, enables the pilot to monitor the essential parameters of the flight (pitch and roll attitudes, heading, radio-altitude, speed, path, etc.) whilst still observing the exterior during the takeoff phase and in particular during the landing phase.

The head-up control system or display receives the guidance information (heading, attitudes, drift, gradient, etc.) from an inertial unit located in the aircraft hold. On the basis of this information, the head-up control system can display the symbols representing the exterior and the position of the aircraft with respect thereto. These symbols constitute vital information for the pilot when visibility is bad.

In order that the symbols displayed by the head-up control system are correctly superimposed on the exterior or external environment, it is necessary to accurately regulate the orientation of the structure supporting the optical head of said system. This regulation or control, known as harmonization of the head-up control system or display takes place in the factory on a once and for all basis.

More specifically, the regulation of the orientation of the structure supporting the optical head of the head-up control system consists of a regulation in accordance with the longitudinal, lateral and vertical axes of the aircraft.

As in the process described in FR-A-2,632,060, the reference can be the support of the inertial unit, whose three axes can be referenced by the following parameters:
pitch attitude,
roll attitude,
heading (geographical, magnetic, etc.).

In the known regulating process described in FR-A-2,632,060, the pitch and roll attitudes are regulated by attitude gauges. However, the heading of the structure supporting the optical head of the head-up control system or display is regulated by an optical system incorporating a laser, a plane mirror and a prism. The heading of the support structure is regulated by successively orienting the laser beam towards the prism mounted on the inertial unit support placed in the aircraft hold and then towards the mirror installed on the support structure.

However, despite its great simplicity, this process also suffers from certain disadvantages. Thus, its putting into operation makes it necessary to remove the internal lining of the aircraft to enable the laser to be successively oriented towards the prism and then the mirror. Moreover, the aircraft must be placed on a frame and the process is made relatively long and complicated by the fragility of the equipment used. The precision of the settings is also poorly defined and difficult to control.

The invention relates to a novel process for regulating the orientation of a support structure such as that supporting the optical head of a head-up control system or display and which does not suffer from the disadvantages of the known processes, whilst more particularly bringing about a good precision for a relatively short regulation time, no matter what the position of the aircraft and by means of a single procedure for performing the two attitude settings and the heading setting.

SUMMARY OF THE INVENTION

According to the invention, this result is obtained by means of a process for regulating the orientation of a support structure in an aircraft, comprising the following stages: fitting an inertial unit to a reference structure able to subsequently receive said unit and measure a first pitch attitude, a first roll attitude and a first heading, fitting the inertial unit to the support structure and measuring a second pitch attitude, a second roll attitude and a second heading, regulating the orientation of the support structure so that the second pitch attitude, the second roll attitude and the second heading are respectively equal to the first pitch attitude, the first roll attitude and the first heading.

In practice, the inertial unit is fitted to the support structure by installing on the latter an intermediate support and then fitting said inertial unit on said intermediate support.

Before measuring the first pitch attitude, the first roll attitude and the first heading, into the inertial unit are entered the geographical coordinates of the aircraft in accordance with a known alignment process. Before measuring the second pitch attitude, the second roll attitude and the second heading, into the inertial unit are again entered the geographical coordinates of the aircraft in accordance with said same known alignment process.

The preferred application for the present invention is in the regulation of the orientation of the support structure of the optical head of the head-up display of an aircraft.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE INVENTION

Figure 1:
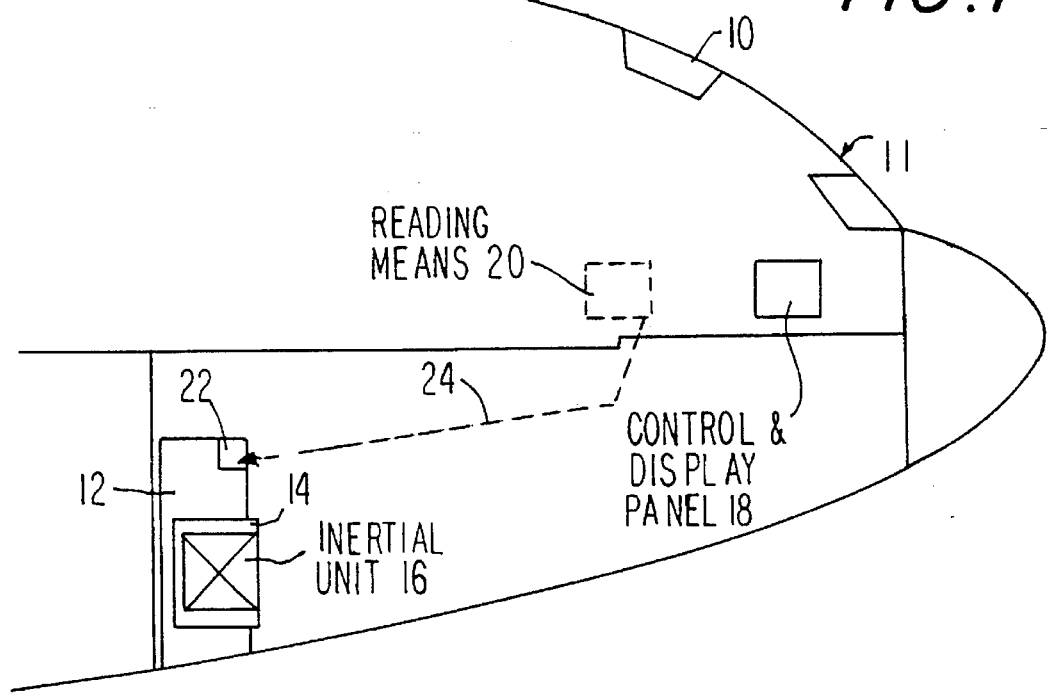
FIGS. 1 and 2 are longitudinal sectional views in a vertical plane of the front of an aircraft equipped with a structure for supporting the optical head of a head-up display, diagrammatically illustrating the two successive stages of the process which, according to the invention, makes it possible to regulate the orientation of said structure.
Figure 2:
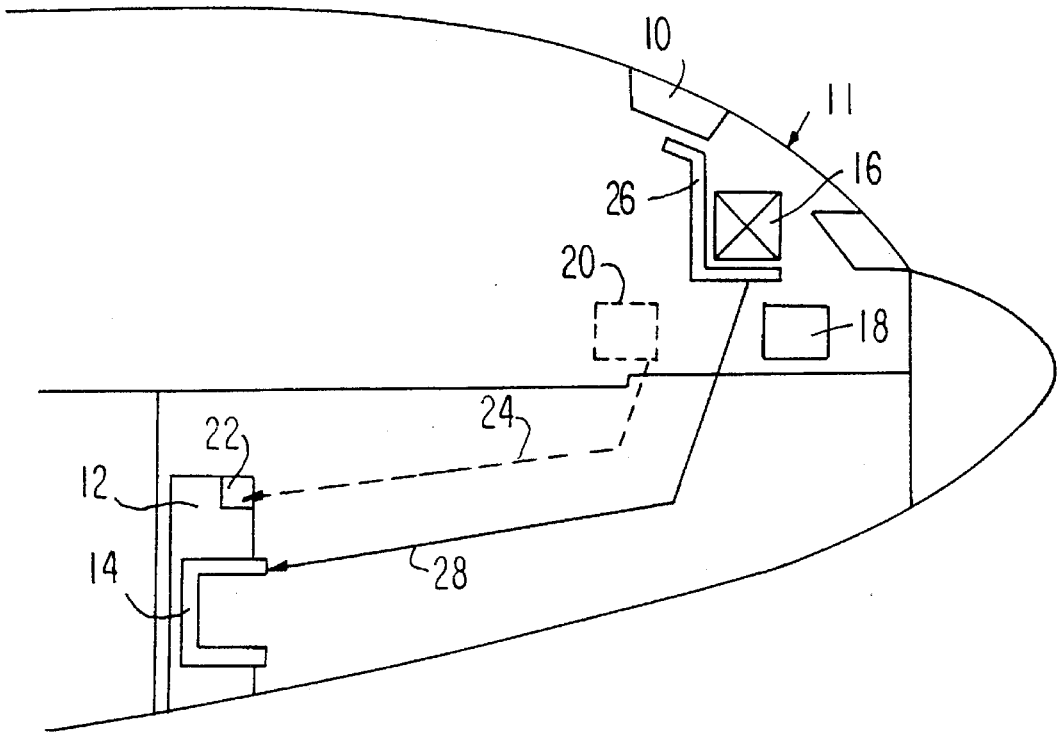

In FIGS. 1 and 2, reference numeral 10 designates the support structure for the optical head of a head-up control system or display of an aircraft 11, whereof only the front part is diagrammatically shown. This support structure 10 is fixed to the structure of the aircraft 11, in the upper part of the flight deck.

During the assembly of the aircraft in the factory, the orientation of the support structure 10 must be accurately regulated with respect to the aircraft structure, so that the information which will subsequently be displayed by the head-up display when the aircraft is in flight will perfectly coincide with the real situation of the aircraft with respect to the outside world.

This regulation of the orientation of the support structure 10 with respect to the aircraft structure is broken down into a setting of three parameters, which are namely the pitch attitude, the roll attitude and the heading. In order to permit this regulation or setting, the support structure 10 is fixed to the aircraft structure by regulating means which can assume different forms and do not constitute part of the invention. For example, the regulation of the pitch and roll attitudes can take place by means of shims, such as peel shims, whereof a given number can be removed in order to obtain the desired orientation. Also in exemplified manner, the heading can be regulated by means of a device, such as an oblong hole permitting a displacement of the support structure 10 until the desired heading orientation is obtained.

FIGS. 1 and 2 also show an electronic cabinet 12 positioned in the aircraft hold. This electronic cabinet 12 has a support or rack 14 for receiving an inertial unit 16. The rack 14 constitutes a reference structure, whose orientation (i.e. its pitch and roll attitudes and heading) has been regulated beforehand.

According to the invention, use is made of the inertial unit 16 in order to orient the support structure 10 of the optical head of the head-up control system or display precisely in the same way as the reference structure constituted by the rack 14 and which supports said unit.

For this purpose, in the manner shown in FIG. 1, initially measurement takes place of the three parameters (pitch and roll attitudes and heading) defining the orientation of the reference structure constituted by the rack 14. For this purpose the inertial unit 16 is installed on its rack 14, as shown in FIG. 1.

After the inertial unit 16 has been rendered live, a known, alignment operation is performed. This operation consists of initiating the inertial unit by supplying it with the geographical coordinates of the aircraft. It is carried out from the control and display panel (CDP) 18 installed in the aircraft flight deck. This control and display panel 18 constitutes the interface by which, when the aircraft is operational, the pilot will communicate with the different airborne computers. The control and display panel 18 is also connected to the inertial unit 16, when it is located on its rack 14, so that the alignment of the inertial unit 16 is entirely performed with the equipment carried by the aircraft. For information purposes, this alignment operation lasts about 10 minutes.

The inertial unit 16 is then operational. Therefore the three orientation parameters of the rack 14, namely the pitch and roll attitudes and the heading of the aircraft, can be accurately measured. For this purpose use is made of means for reading information supplied by the unit 16, which are essentially dependent on the nature of the latter. These reading means 20 are connected by an electrical conductor 24 to a test plug 22 provided for this purpose on the electronic cabinet 12. For example, the reading means 20 can comprise a bus reader ARINC.

As illustrated in FIG. 2, when the three orientation parameters of the aircraft have been measured on the rack 14, the inertial unit 16 is removed from the latter and is placed on an intermediate rack or support 26, which has previously been fixed to the support structure 10, whose orientation is to be regulated. The intermediate rack 26 has a completely known geometry and it is accurately fixed to the support structure 10 in such a way that the orientation of the intermediate rack 26 is perfectly representative of the orientation of the support structure 10.

When the inertial unit 16 is installed on the intermediate rack 26, as shown in FIG. 2, it is connected to the rack 14 placed on the electronic cabinet 12 by an electrical extension wire bundle 28.

When the connections have been made, the inertial unit 16 is again rendered live and it is aligned in the same way as hereinbefore by entering the geographical coordinates of the aircraft from the control and display panel 18.

When this operation is at an end, using the reading means 20, measurement takes place of the same orientation parameters as previously. The differences measured in this way for each of the three orientation parameters (pitch and roll attitudes and heading) between the values collected when the inertial unit 16 is fitted to the intermediate rack 26 and the values collected when the inertial unit is fitted to the rack 14 represent, for each of these parameters, the adjustment which has to take place on the support structure 10.

The three requisite orientation settings are then made on the support structure 10 by acting on the regulating means interposed between said support structure and the aircraft structure.

As a function of the nature of these regulating means, the regulation can be carried out in a single operation or in an iterative manner, i.e. repeating the measurements of the parameters supplied by the inertial unit 16 when it is fitted to the intermediate rack 26 after each operation of regulating the support structure 10 until the necessary precision is obtained for each of the three parameters.

When the regulation or setting of the support structure 10 is at an end, the electrical extension wire bundle 28 is removed the inertial unit 16 replaced on its rack 14 and the conductor is disconnected from the test plug 22. Finally, the intermediate rack 26 is dismantled and the optical head of the head-up display is fixed to its support structure 10.

We claim:

1. Process for regulating an orientation of an aircraft support structure and its inertial unit, in which an aircraft comprises an electronic cabinet having a test plug and a rack adapted for receiving an inertial unit of the aircraft, with the pitch attitude, roll attitude and heading of the rack regulated in advance, said process comprising the following steps:

fitting said inertial unit to the rack, electrically connecting the test plug of the electronic cabinet to a reading means, and measuring a first pitch attitude, a first roll attitude and a first heading on said reading means from said inertial unit;

removing the inertial unit from the rack and fitting said inertial unit to the aircraft support structure to be oriented, electrically connecting the inertial unit to the rack by an extension wire bundle, and precisely measuring a second pitch attitude, a second roll attitude and a second heading on said reading means from said inertial unit;

said measuring step being performed with measuring means available on the aircraft;

adjusting an orientation of the support structure such that the second pitch attitude, the second roll attitude and the second heading are respectively equal to the first pitch attitude, the first roll attitude and the first heading without a need to be oriented to an aircraft reference;

removing said inertial unit from the support structure to be oriented and replacing said inertial unit on the rack of the electronic cabinet provided in the aircraft.

2. Process according to claim 1, wherein said inertial unit is fitted to the support structure to be oriented by mounting an intermediate support on the support structure and then fitting the inertial unit to the intermediate support.

3. Process according to claim 1, wherein the process regulates an orientation of the support structure of an optical head of a head up display of an aircraft.

4. Process for regulating an orientation of an aircraft support structure and its inertial unit, in which an aircraft comprises an electronic cabinet having a test plug and a rack adapted for receiving an inertial unit of the aircraft, with the pitch attitude, roll attitude and heading of the rack regulated in advance, said process comprising the following steps:

fitting said inertial unit to the rack, whereby said unit is connected with a control and display panel installed in a flight deck of the aircraft; and supplying said inertial unit with geographical coordinates of the aircraft from said control and display panel;

electrically connecting the test plug of the electronic cabinet to reading means, and precisely measuring a first pitch attitude, a first roll attitude and a first heading on said reading means from sad inertial unit;

removing the inertial unit from the rack, fitting said inertial unit to the support structure to be oriented, and electrically connecting said inertial unit to the rack by an extension wire bundle, whereby said inertial unit is again connected with the control and display panel, and supplying again the inertial unit with geographic coordinates of the aircraft from said display panel, said step of precisely measuring the first pitch attitude, the first roll attitude and the first heading of the aircraft being performed with measuring means already on the aircraft measuring a second pitch attitude, a second roll attitude and a second heading on said reading means from said inertial unit without a need to orientate the support structures to a reference plane of the aircraft;

adjusting an orientation of the support structure relative to the rack such that the second pitch attitude, the second roll attitude and the second heading are respectively equal to the first pitch attitude, the first roll attitude and the first heading;

removing said inertial unit from the support structure to be oriented and mounting said inertial unit on the rack of the electronic cabinet provided in the aircraft.

* * * * *